Aug. 22, 1967    H. J. DORGELYS    3,337,082
CONTAINERS AND STORAGE FACILITIES THEREFOR
Filed Jan. 13, 1965    2 Sheets-Sheet 1

INVENTOR.
HENRI J. DORGELYS
BY
*Baldwin and Martin*
ATTORNEYS

Aug. 22, 1967  H. J. DORGELYS  3,337,082
CONTAINERS AND STORAGE FACILITIES THEREFOR
Filed Jan. 13, 1965  2 Sheets-Sheet 2

INVENTOR.
HENRI J. DORGELYS
BY
*Baldwin and Martin*
ATTORNEYS

United States Patent Office 3,337,082
Patented Aug. 22, 1967

3,337,082
CONTAINERS AND STORAGE FACILITIES
THEREFOR
Henri J. Dorgelys, 1076 Hendricks Ave.,
Jacksonville, Fla. 32207
Filed Jan. 13, 1965, Ser. No. 425,128
7 Claims. (Cl. 220—23.4)

This invention relates to containers and to storage facilities therefor.

A general object is to provide improvements in containers and storage facilities therefor.

Pharmacists, chemists, doctors, and others, including housewives, are constantly using ingredients housed in different containers during their daily routine. In most cases the containers are stored on shelves and the containers are so constructed that the container closure must be removed and replaced each time the container is removed from the shelf for use. This is inconvenient, troublesome, and time consuming to the individual, and in many cases this could be overcome if the containers were provided with a permanent opening through which the contents could be readily dispensed without removing the usual closure element. However with a permanent opening, the contents of the container is exposed to dust, dirt, and the elements, and if a volatile liquid is housed in the container, it may vaporize during storage unless the opening is closed when the container is not in use.

One object of the invention is to provide an apparatus including containers for housing ingredients that can be removed from the storage facility and used without the need for removing a closure component and which can thereafter be returned to the storage facility and stored without exposing the contents to the elements.

Yet another object is to provide apparatus for conveniently storing containers that are frequently used and to provide apparatus that facilitates the removal of the containers from and their replacement in the storage facility.

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

Figure 1:
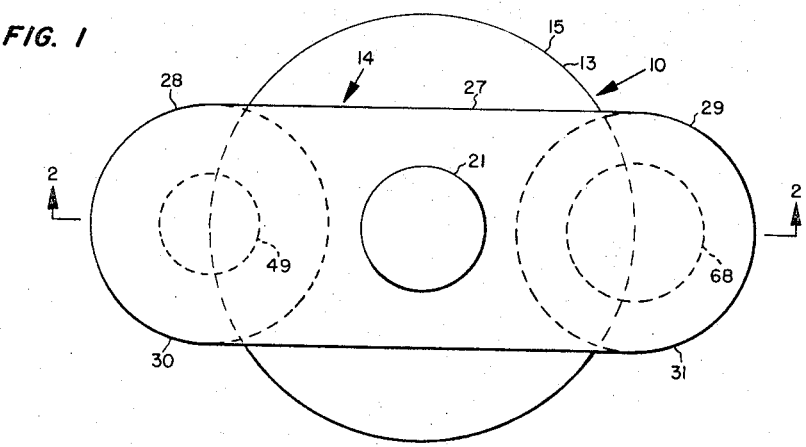
FIG. 1 is a plan view of an apparatus embodying the invention.
Figure 2:
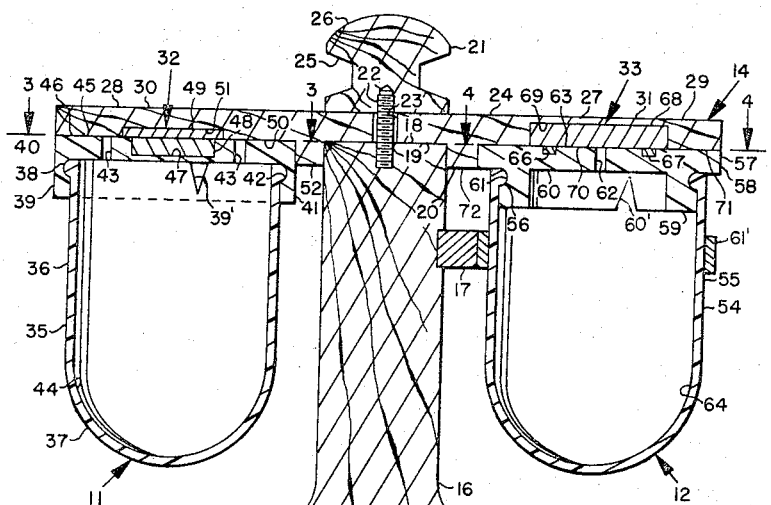
FIG. 2 is a vertical section through the apparatus of FIG. 1 as seen along the line 2—2 therein.
Figure 3:
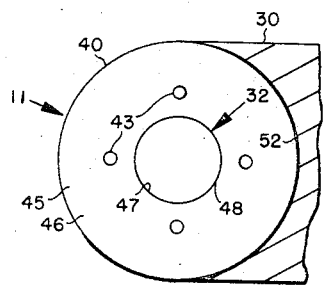
FIG. 3 is a plan view of the closure element of one of the containers seen in FIG. 2, and includes a fragment of the rack as seen along the lines 3—3 therein.
Figure 4:
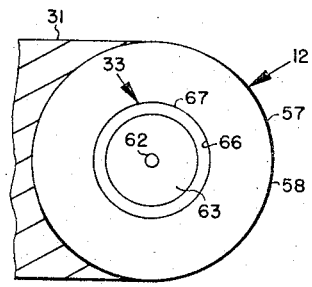
FIG. 4 is a plan view of the closure element of the other container seen in FIG. 2, together with an adjacent fragment of the rack structure as seen along the lines 4—4 therein.

The embodiment of the invention as seen in FIGS. 1–4 is depicted in the form of containers for salt and pepper which are stored in a holder of simple design that is adapted for placement on a table commonly used for eating purposes. The holder is designated generally at 10, and the containers for the salt and pepper are generally designated at 11 and 12 respectively.

Holder 10 includes a standard 13, that supports a rack 14 from which the containers are suspended when stored in the facility. Standard 13 may be made from any suitable material, such as wood as shown in the drawing, or plastic or the like. It includes a shallow, solid, cylindrical base portion 15 in the illustration and which is adapted to rest on a table, not shown. Integrally formed with the base portion 15, is an upright cylindrical post 16 on which the rack 14 is supported at its upper end 18. In the assembled holder 10, the upper end 18 of the post fits in a centrally located circular recess 19 in the downwardly facing surface portion 20 of the rack, and the rack is releasably secured in position by a nut 21. Nut 21 threadedly engages the upper end of a threaded element 22 that is fixed at its lower end in the upper end 18 of the post 16. Element 22 is arranged coaxially with the cylindrical post and extends through a hole 23 in the rack that passes between the upper 24 and lower 20 surfaces of the rack. The nut 21 is fashioned with a groove 25 and a spherical sector 26 as shown for decorative purposes. Rack 14 includes an elongated plate element 27 which is arranged horizontally in the assembled holder and which may be made from wood, plastic or other suitable material. The edges at the opposite ends 28 and 29 of the plate are rounded for decorative purposes in a semicircular fashion that conforms to the contours of the container portions suspended therebelow.

Containers 11 and 12 are suspended from the opposite arms 30 and 31 of the rack by magnetic mechanisms that are respectively designated at 32 and 33 in the illustration. Each of the mechanisms has an element which is carried by the place and which forms a component thereof, and yet another element which forms a component of the container. In each instance, one element is made from paramagnetic material such as iron or steel whereas the other element is permanently magnetized material so that the container is suspended from the rack during storage by magnetic forces.

The bottom portion 35 of container 11 includes a hollow cylindrical shell 36 which is closed at its lower end by a semi-spherical wall 37 that is formed integral with the shell. The open end of the shell is provided with an exterior annular lip 38 which serves to hold the cap or closure element 39 in position in the assembled container 11. The closure element 39 of the container 11 has a flat circular disk portion 40 which is provided with an annular flange 41 that depends from the bottom face of the disk. Flange 41 is adapted to lap the upper end of the shell in the assembled container and is provided with an annular interior recess or groove 42 that conforms to the contour of the lip 38, thus enabling a tight seal to be realized between the cap and upper edge portion of the shell or body 36 of the container. Except for element 48 the components of the container illustrated are made from resilient plastic materials that are sufficiently yieldable to enable the cap to be snapped on or off, and the shell 36 may be provided with one or more notches or slits 39' to permit it to yield inwardly for this purpose. The cap 39 is provided with a plurality of passageways which provide holes or openings 43 which communicate with the hollow interior portion 44 of the container and also with the exterior 45 to enable the container contents to be readily dispensed by the user when the container is withdrawn from the storage facility therefor. The upper face 46 of the cap has a centrally located circular recess portion 47 that contains a flat circular disk component 48 of mechanism 32. This component 48 of the container is glued or otherwise secured in the closure recess and is a permanent magnet that cooperates with the other paramagnetic component 49 of the mechanism 32 illustrated. It will be apparent that alternatively, member 49 may be a permanent magnet and member 48 paramagnetic.

The bottom surface 20 has a recessed portion 50 in arm 30 which is adapted to receive the upper face 46 of the closure element 39 thereagainst when the container is in storage. The flat circular disk component 49 of the mechanism 32 is glued or otherwise secured in another and axially arranged recess 51 in the recessed surface portion 50. Components 48 and 49 of mechanism 32 are coaxially aligned and confront one another when the container 11 is stored in the holder 10.

The flux of the permanent magnet is sufficiently strong to hold the container 11 and its contents against the recessed lower surface portion 50 of the rack when in storage while nevertheless enabling the user to conveniently withdraw the container from the rack. Withdrawal can be accomplished by pulling the container downward. However, in the illustrated arrangement the recess surface 50 is unconfined by exterior end walls so that the container can be conveniently withdrawn by pulling the container laterally in a direction parallel with the longitudinal axis of the rack arm 30. Recessed surface 50 on the other hand is confined by a semicircular interior wall 52 that conforms to the edge portion of the cap. This wall serves as a stop element and aids in lining up components 49 and 48 of mechanism 32 when the container 11 is replaced in the storage facility after use. Surface 50 also conforms to the contour of the upper face 46 of the cap. As such, when the container is properly housed in the facility, openings 43 are closed by the surface 50 and the container contents are sealed from the exterior elements.

Although the same type container and mechanism used for its suspension from arm 30 may be employed on the other arm 31 side of the holder, a somewhat different arrangement or modification is shown to better illustrate the invention.

Container 12 has a bottom portion 54 which is like that shown for container 11 except that in this instance the shell 55 has an annular interior lip 56 at its open end. The flat circular disk portion 57 of the cap 58 is adapted to close and effectively seal the open end of the shell 55 when the container is assembled but the flange 59 of the closure element 58 is offset from the edge of the disk portion and depends from the bottom surface 60 in a manner such as to fit into the open end of the shell. Flange 59 has an exteriorly facing annular groove 61 which is adapted to receive the lip 56 so as to effectuate a tight seal along the edges of the shell thereat. The disk 57 and flange 59, of the cap are made from resilient plastic material in the illustration so as to be yieldable when the cap is snapped on or off the bottom portion to engage the lip, and flange 59 may be notched or slotted as at 60′ to permit the flange to more readily yield inwardly while attaching or detaching the cap. Polyethylene and Teflon have been found to be suitable plastics for such purposes. The container assembly 12 in this instance has but one passageway in the form of an opening 62 which communicates with the exterior 63 and the hollow interior portion 64 of the container. This opening 62 is along the axis of the disk portion 57 of the cap and communicates with the exterior 63 when the container is removed from the storage facility.

The cap 58 has an annular groove 66 that surrounds the exterior end portion of opening 62 and the paramagnetic element 67 of mechanism 33 is mounted in this groove. Element 67 is annular in shape and constitutes an integral portion or component of container 12, the ring like element 67 being glued or otherwise secured to the cap 57 in the groove. The permanent magnetic component 68 of mechanism 33 is in the form of a shallow cylindrical element which is carried on the underside of arm 31 in recess 69. The lower face 70 of the element 68 is flush with and forms a part of the recessed surface 71 of the bottom surface 20 of the assembled rack 14.

The recessed surface 71 is unconfined by an end wall and hence container 12 may be removed from and replaced in the rack in a manner like that described with respect to container 11. The upper surface of cap 58 is adapted to fit flush against the recessed surface portion 71 of surface 20 when the container 12 is stored on the rack and the opening 62 under such circumstances is covered and sealed against the lower face 70 of the magnetic element 68. The recessed surface 71 is surrounded adjacent the standard 13 by an arcuate wall 72 which like wall 52 conforms to the contour of the cap. Wall 72 serves as a stop element or guide in lining up the components 67 and 68 of the mechanism 33 when the container 12 is replaced in the rack after use.

It may be desired, in order to insure proper positioning of container 12 on the rack, to provide a paramagnetic band 61′ affixed to and extending around the body portion 55 of the container and a cooperating permanent magnet element 17 attached to the post 16. The magnet 17 is so disposed that, when the container 12 is in proper position on the rack, band 61′ is in engagement with the magnet.

Figure 5:
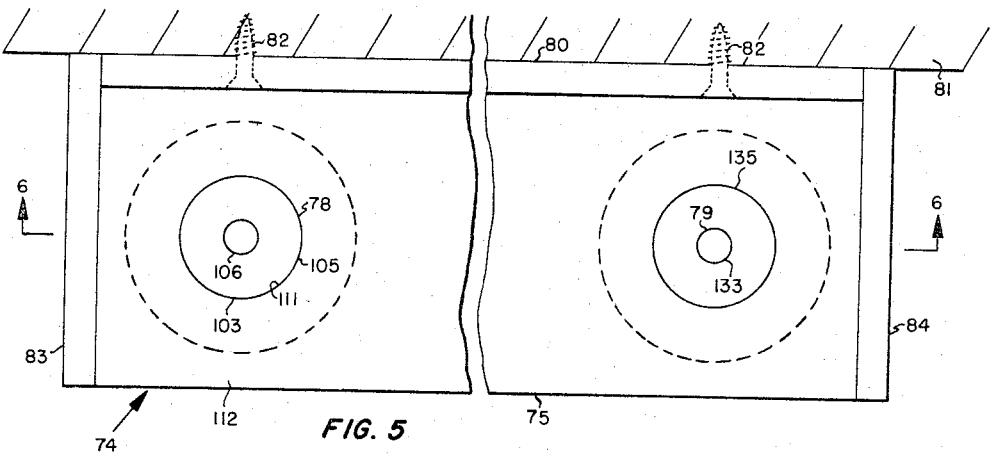
FIG. 5 is a plan view of another apparatus embodying the invention with certain parts removed.
Figure 6:
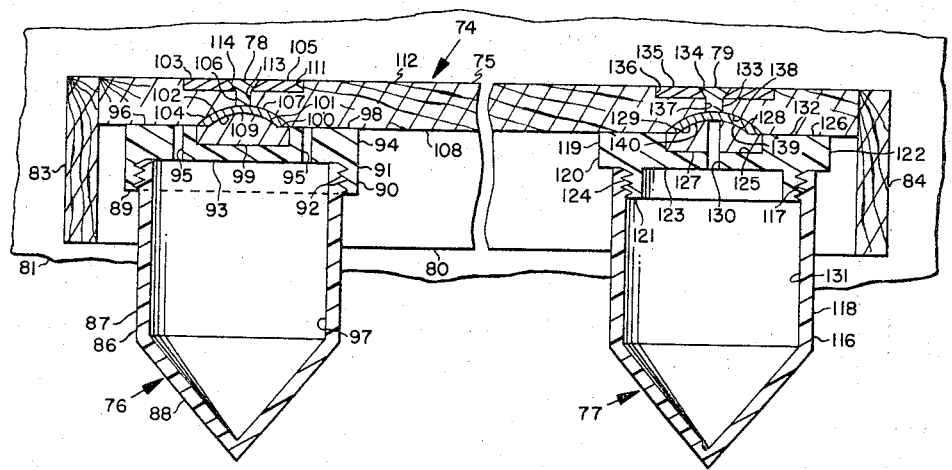
FIG. 6 is a vertical section through the embodiment of FIG. 5 as seen along the lines 6—6 therein.
Figure 7:
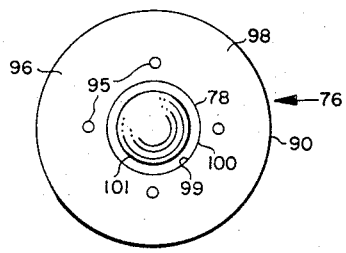
FIG. 7 is a top view of one of the containers seen in FIG. 6.
Figure 8:
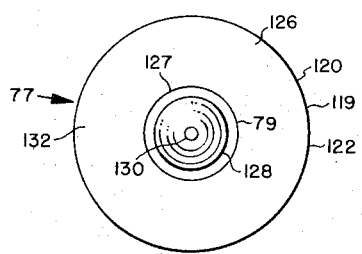
FIG. 8 is the top view of the other container seen in FIG. 7.

The invention is illustrated further by the embodiment in FIGS. 5–8 and in which the storage facility or holder for the containers is shown as a wall attachment from which a plurality of containers may be suspended, only the two end containers and associated structure being shown, it being apparent that provision may be made for similarly storing others between those illustrated. The rack 74 in this embodiment has an elongated flat plate 75 from the underside of which the end containers 76 and 77 are shown suspended by magnetic mechanisms 78 and 79. An elongated back piece 80 is fixed to the rear edge of the plate 75 and the latter is mounted horizontally from a permanent wall 81 by means of screw fasteners designated at 82 and which extend through piece 80. End braces 83 and 84 are provided at the opposite ends of the rack to strengthen the structure.

Container 76 and mechanism 78 illustrate one form of apparatus that may be used in suspending containers in the storage facility in accord with the invention whereas container 77 and mechanism 79 illustrates yet another form in which the invention may be used to accomplish the same purpose. Each of the containers in the illustration shown in FIGS. 5–8 has a bulbular portion formed by one of the elements of the magnetic mechanism. The bulbular portion fits in a socket element of another component of the mechanism and facilitates proper location of the container in the storage rack as the container is being replaced after use.

The bottom portion 86 of container 76 comprises a hollow thin walled cylindrical shell 87 which is closed at the lower end by a conical wall section 88 that is formed integral with the shell. Like the hemispherical portions of the containers in the previously described embodiment, the conical wall section 88 is provided in the manner shown to prevent the container user from placing the container on a table or like after use. Since the container is incapable of resting upright, the user is more inclined to replace it in the rack.

The open end of the shell 87 is provided with exterior threads 89 and the closure or cap component 90 of the container 76 is provided with an annular flange 91 having interior threads 92 that mesh with threads 89 and enable the cap to be screwed on or off the bottom portion 86 when it is desired to replace the contents of the container. Flange 91 depends from the bottom surface 93 of the circular disk portion 94 of the cap and portion 94 is adapted to cover the open end of the shell when the container is fully assembled.

Cap 90 has a plurality of passageways with holes 95 that extend between the upper 96 and lower 93 surfaces of the disk 94 to enable dispensation of the container contents by the user upon removal of the container from the rack 74. These holes 95 communicate with the interior hollow portion 97 of the container and through surface 96 with the exterior 98 of the container. Holes 95 are spaced from each other and offset from a central circular recess 99 in surface 96 and against which the permanent magnet component 100 of mechanism 78 is glued or otherwise secured. Component 100 has a spherical segment that projects above the otherwise planar surface 96 of the cap and which creates a bulbular portion 101 on the container that fits in a socket 102 in rack 74. This arrangement facilitates replacement of container 76 in rack 75 as previously indicated.

The permanent magnet 100 constitutes a component of container 76 whereas the other component 103 of mechanism 78 is carried by the rack 74 and forms a part thereof.

Component 103 is composed of three elements 104, 105, and 106 in the illustration, and these elements are made from paramagnetic material such as iron or steel so as to cooperate with the permanent magnet of cap 90 in suspending the container. Element 104 is in the form of a thin walled spherical segment which is glued or otherwise secured in a matching recess 107 in the downwardly facing lower surface 108 of the plate 75 and the downwardly facing surface 109 of the element 104 constitutes an extension of surface 109 and the socket 102 in which the bulbular portion 101 of the container fits during the storage thereof. Element 105 is a flat circular member which fits in a circular recess 111 in the upper surface 112 of plate 75. Plate 75 is provided with a circular opening 113 that communicates with recesses 107 and 111 at its opposite ends, and the third element fits in the opening. The lower end of member 106 is secured to element 104 whereas the upper end is flared and fits in a central countersink 114 in element 105.

It will be noted in the drawings that the upper surfaces 96 of the cap fits flush against the lower surface 108 of the plate when the container 76 is suspended from the rack 74 and thus provides an effective means for closing openings 95 and sealing the container contents from dust, leakage, and dampness during storage.

The bottom portion 116 of container 77 is like that of container 76 except that it is provided with internal threads 117 at the open end of the shell 118. The circular disk portion 119 of the cap 120 is adapted to cover and thereby close the open end of the shell when the container is fully assembled. The annular flange 121 in this instance however is inwardly offset from the edge of the disk portion, depends from the lower face 123 thereof and is provided with external threads 117 so that the cap can be screwed on or off the bottom portion 116.

The cap has a circular recessed portion 125 in its upper surface 126 and the component 127 of mechanism 79, which is glued or otherwise secured to the disk in the recess 125. Component 127 also has a spherical segment that protrudes above the otherwise planar upper surface 126 of cap and which thus forms a bulbular element 128 that fits in another socket 129 in the plate 75. The cap is provided with a hole 130 or opening that communicates with the interior 131 and exterior 132 of the container for dispensing the container contents. This hole 130 communicates with the hollow 131 through the lower surface 123 of the disk and extends through the paramagnetic component 127 to the exterior. The magnetic components 132 in this instance is in the form of a solid cylindrical member 133 having a flared upper end which fits in a central countersink 134 of a disk 135 that rests in a circular recess 136 in the upper surface 112 of the plate. The lower end of member 133 fits in a vertically extending hole 137 in the plate 75 and which extends between recess 136 and another recess 138 in the lower surface thereof. The latter recess 138 is adapted to accommodate a thin walled spherical segment 139 having a downwardly facing convex surface portion 140 that defines the socket 129 for receiving bulbular portion 128. The lower end of the magnet is glued or otherwise secured to element 139. Surface portion 140 covers the exterior end opening 130 and serves to seal the contents of the container from the elements when the container is stored in the rack.

From the previous description it is apparent that different embodiments may be created without departing from the spirit of the invention. The permanent magnets may be embodied in either the container or rack structure and cooperate with paramagnetic material embodied in the other structure. Furthermore any number of containers may be stored on the holder shown in FIGS. 1–4 by simple modification thereto. Furthermore a plurality of racks of the kind illustrated in FIGS. 5 and 6 may be secured to a wall if desired.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. The combination of a refillable container for granular condiments and the like comprising a hollow body portion and a top cap member removably attached to said body portion, said cap member having a flat upper surface and being provided with a dispensing opening through said flat surface communicating with the interior of the container for dispensing the contents, said cap member having at least a portion of its said flat surface consisting of paramagnetic material, and a rack for storing said container and for sealing said opening, said rack including a support member having a planar lower surface and including a permanent magnet element forming at least a part of said planar surface adapted and arranged to magnetically retain said container in depending relation with said surfaces in contact and thereby to seal said opening, said container being movable laterally to slide said cap member along said planar surface beyond an edge of said support member to remove said container from said rack.

2. The combination according to claim 1 wherein said paramagnetic material and said permanent magnet element are in surface contact when said container is in normal retained position on said support member.

3. The combination according to claim 1 wherein said support member has an edge portion spaced oppositely across said planar surface from said edge of said member and said rack includes a positioning abutment extending downwardly below said planar surface at said edge portion, said abutment being engageable by a side portion of said container when said container is in normal retained position on said support member and said container being laterally movable away from said abutment to so slide said cap member beyond said edge.

4. The combination according to claim 1 wherein said container body portion has a rigid bottom comprising a small portion extending below the remainder of the bottom whereby the container is unstable when placed upright on a flat table surface.

5. The combination according to claim 4 wherein the external surface of the bottom of said container is a rounded convex surface.

6. The combination according to claim 5 wherein the external surface of the bottom of said container is in the shape of a zone of a sphere.

7. The combination according to claim 5 wherein the external surface of the bottom of said container is in the shape of a cone.

References Cited

UNITED STATES PATENTS 2,766,909  10/1956  Doyle _____ 222—105

THERON E. CONDON, *Primary Examiner.*

G. T. HALL, *Assistant Examiner.*